US010625802B2

(12) United States Patent
Suzuki et al.

(10) Patent No.: US 10,625,802 B2
(45) Date of Patent: Apr. 21, 2020

(54) REAR FENDER SUPPORTING STRUCTURE OF SADDLE-TYPE VEHICLE

(71) Applicant: HONDA MOTOR CO., LTD., Tokyo (JP)

(72) Inventors: Yuta Suzuki, Saitama (JP); Masakazu Kadota, Saitama (JP); Rui Maeda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 15/915,221

(22) Filed: Mar. 8, 2018

(65) Prior Publication Data
US 2018/0273126 A1 Sep. 27, 2018

(30) Foreign Application Priority Data

Mar. 23, 2017 (JP) .................. 2017-057387

(51) Int. Cl.
B62J 15/02 (2006.01)
B62K 25/28 (2006.01)
B62K 25/00 (2006.01)

(52) U.S. Cl.
CPC ............ B62J 15/02 (2013.01); B62K 25/005 (2013.01); B62K 25/283 (2013.01)

(58) Field of Classification Search
None
See application file for complete search history.

(56) References Cited

U.S. PATENT DOCUMENTS 4,742,884 A 5/1988 Ishikawa

FOREIGN PATENT DOCUMENTS

CN 2295661 Y 10/1998
CN 2335816 Y 9/1999
(Continued)

OTHER PUBLICATIONS

Ducati: Spare Parts Catalogue Multistrada 1200 ABS Model Year 2010, Spare Parts Catalogue No. 915.1.299.1A. Published Jun. 2010; Retrieved from https://www.ducati.com/ww/en/service-maintenance/spare-parts-catalogs (Year: 2010).*

(Continued)

Primary Examiner — Joseph M Rocca
Assistant Examiner — Harold Eric Pahlck, III
(74) Attorney, Agent, or Firm — Paratus Law Group, PLLC

(57) ABSTRACT

A rear fender supporting structure of a saddle-type vehicle includes a rear wheel supported through a swing arm to a body frame, and a rear fender covering a rear upper part of the rear wheel. The rear fender is supported to the swing arm on one side in a left-right direction. The swing arm includes an arm portion extending in a front-rear direction, a through hole provided at a rear end of the arm portion to support an axle, and a split-clamp portion supporting the axle by fastening an upper circular-arc and a lower circular-arc surrounding the through hole with a fastening member. The rear fender is mounted on a front-side fixing portion positioned on a front side of the upper circular-arc and on an upper surface of the arm portion, and on a rear-side fixing portion positioned on a rear side of the lower circular-arc.

6 Claims, 8 Drawing Sheets

(56) References Cited

FOREIGN PATENT DOCUMENTS

| | | |
|---|---|---|
| CN | 2486358 Y | 4/2002 |
| CN | 1424222 A | 6/2003 |
| JP | S61-185693 U1 | 11/1986 |

OTHER PUBLICATIONS

Rubber Side Up: 2010 Ducati Multistrada 1200S 1200 S Rear Wheel Fender Mudguard Hugger Black 565.1.047.1A; Retrieved from: http://www.rubbersideup.com/2010-ducati-multistrada-1200s-1200-s-rear-wheel-fender-mudguard-hugger-black-565-1-047-1a (Year: 2019).*

Aug. 3, 2018, European Search Report issued for related EP Application No. 18160666.6.

Ducati, Spare parts catalogue 1200 S ABS model year 2010, Spare parts catalogue part No. 915.1.301.1A, Dec. 2009, pp. 1-159, retrieved from: http://www/motorcycleinfo.co.uk/resources/6795/assets/images/Ducati_MTS1200/other/MTS1200ABS_Eu-Spare_parts_2010.pdf.

May 28, 2019, European Communication issued for related EP Application No. 18160666.6.

BMW, Rider's Manual R 1200 GS, Aug. 1, 2016, pp. 1-247, Order No. 01 40 8 388 381 06.2016, 1st edition, XP055590660, BMW, Munich, Germany.

Sep. 4, 2019, Chinese Office Action issued for related CN Application No. 201810242797.4.

\* cited by examiner

REAR FENDER SUPPORTING STRUCTURE OF SADDLE-TYPE VEHICLE

CROSS-REFERENCE TO RELATED APPLICATIONS

The present application claims the benefit of priority of Japanese Patent Application No. 2017-057387, filed on Mar. 23, 2017, the content of which is incorporated herein by reference.

TECHNICAL FIELD

The present invention relates to a rear fender supporting structure of a saddle-type vehicle.

BACKGROUND ART

A related-art saddle-type vehicle includes a rear fender which is disposed separately from a rear part of the vehicle to only cover the rear upper part of a rear wheel. For example, JP-UM-A-S61-185693 discloses a supporting structure of such a saddle-type vehicle in which a rear fender is supported by using a chain cover mounted on a swing arm extending rearward of a vehicle body to support a rear wheel.

Although the rear fender disclosed in JP-UM-A-61-185693 is small such that the rear fender itself only covers the rear upper part of the rear wheel, the supporting structure thereof is formed in large size to extend from the front part of the swing arm over the rear upper part of the rear wheel. Further, there is a problem that design properties deteriorate due to the imbalance in appearance between the rear fender having small size to cover only the rear upper part of the rear wheel and the supporting structure having large size.

SUMMARY

The present invention has been made in view of the above circumstances, and an object thereof is to provide a rear fender supporting structure of a saddle-type vehicle capable of preventing an increase in size of the supporting structure of the rear fender and achieving excellent appearance design properties.

(1) An embodiment of the present invention provides a rear fender supporting structure of a saddle-type vehicle including:
  a rear wheel which is supported through a swing arm to a body frame swingably in an upper-lower direction; and
  a rear fender which covers a rear upper part of the rear wheel,
  wherein the rear fender is supported to the swing arm on one side in a left-right direction of the saddle-type vehicle,
  wherein the swing arm includes:
    an arm portion which extends in a front-rear direction of the saddle-type vehicle;
    a through hole which is provided at a rear end of the arm portion to support an axle; and
    a split-clamp portion which supports the axle by fastening an upper circular-arc and a lower circular-arc surrounding the through hole with a fastening member, and
  wherein the rear fender is mounted on a front-side fixing portion which is positioned on a front side of the upper circular-arc and is on an upper surface of the arm portion, and on a rear-side fixing portion which is positioned on a rear side of the lower circular-arc.

(2) In the rear fender supporting structure of (1),
  the rear fender may include a Y-shaped arm portion in which a first mounting portion fixed to the front-side fixing portion and a second mounting portion fixed to the rear-side fixing portion extend to come close to each other toward a fender body when viewed from a side, the fender body covering the rear upper part of the rear wheel, and
  either the first mounting portion or the second mounting portion may be fastened with two fastening members.

(3) In the rear fender supporting structure of (2),
  a fastening member for mounting the first mounting portion and a fastening member for mounting the second mounting portion may be disposed substantially parallel to a direction orthogonal to the axle when viewed from an axial direction of the axle.

(4) In the rear fender supporting structure of (2) or (3),
  the Y-shaped arm portion may be curved to one side in the left-right direction of the saddle-type vehicle.

(5) In the rear fender supporting structure of any one of (1) to (4),
  the swing arm may have a cantilever structure configured only by a side on which a power transmission member for the rear wheel is provided in the left-right direction of the saddle-type vehicle,
  the split-clamp portion may have a structure in which the upper circular-arc and the lower circular-arc fasten an outer circumference of a circular cam member capable of adjusting a position of the axle with respect to the swing arm, and
  the front-side fixing portion and the rear-side fixing portion may be disposed substantially on a diagonal line with the circular cam member interposed therebetween.

Advantages

According to the configuration of (1), since the rear fender is mounted on the front-side fixing portion which is positioned on the front side of the upper circular-arc of the split-clamp portion and is on the upper surface of the arm portion, and on the rear-side fixing portion which is positioned on the rear side of the lower circular-arc of the split-clamp portion to be supported at the rear part of the swing arm, an increase in size of the supporting structure of the rear fender is prevented and excellent appearance design properties can be achieved. Further, since the rear fender is mounted at the position in the front-rear direction avoiding the split-clamp portion, it is possible to mount the rear fender at the position where the influence on the fastening force of the split-clamp portion is hardly exerted.

According to the configuration of (2), the rear fender includes the Y-shaped arm portion in which the first mounting portion fixed to the front-side fixing portion and the second mounting portion fixed to the rear-side fixing portion extend to be gradually close to each other toward the fender body when viewed from the side. Therefore, the supporting structure can be made compact and reduced in weight, and it is possible to improve appearance design properties. In addition, since either the first mounting portion or the second mounting portion of the Y-shaped arm portion is fastened by the two fastening members for mounting, the rear fender is fixed in the swing arm at total three locations, and thereby improving the support rigidity.

According to the configuration of (3), since the fastening member for mounting the first mounting portion and the fastening member for mounting the second mounting portion are arranged substantially parallel to the direction orthogonal to the axle when viewed from the axial direction of the axle, it is possible to reduce the influence of the fastening forces of the fastening members on the split-clamping force of the upper circular-arc and the lower circular-arc of the split-clamp portion. As a result, the fastening force of the fastening bolt of the split-clamp portion is hardly affected, and thereby easily maintaining the fastening force of the fastening bolt.

According to the configuration of (4), since the Y-shaped arm portion is curved to one side in the left-right direction of the vehicle, it is possible to lengthen the Y-shaped arm portion to moderately reduce the rigidity. As a result, even when the Y-shaped arm portion is fixed in a structure to straddle the split-clamp portion, it is possible to reduce the influence on the fastening force of the split-clamp portion.

According to the configuration of (5), since the front-side fixing portion and the rear-side fixing portion are disposed substantially on a diagonal line with the circular cam member interposed therebetween. Therefore, the gap between the front-side fixing portion and the rear-side fixing portion can be increased. In addition, the support rigidity of the Y-shaped arm portion can be improved by increasing the width of the tip end portion of the first mounting portion and the second mounting portion of the Y-shaped arm portion.

DESCRIPTION OF EMBODIMENTS

Figure 1:
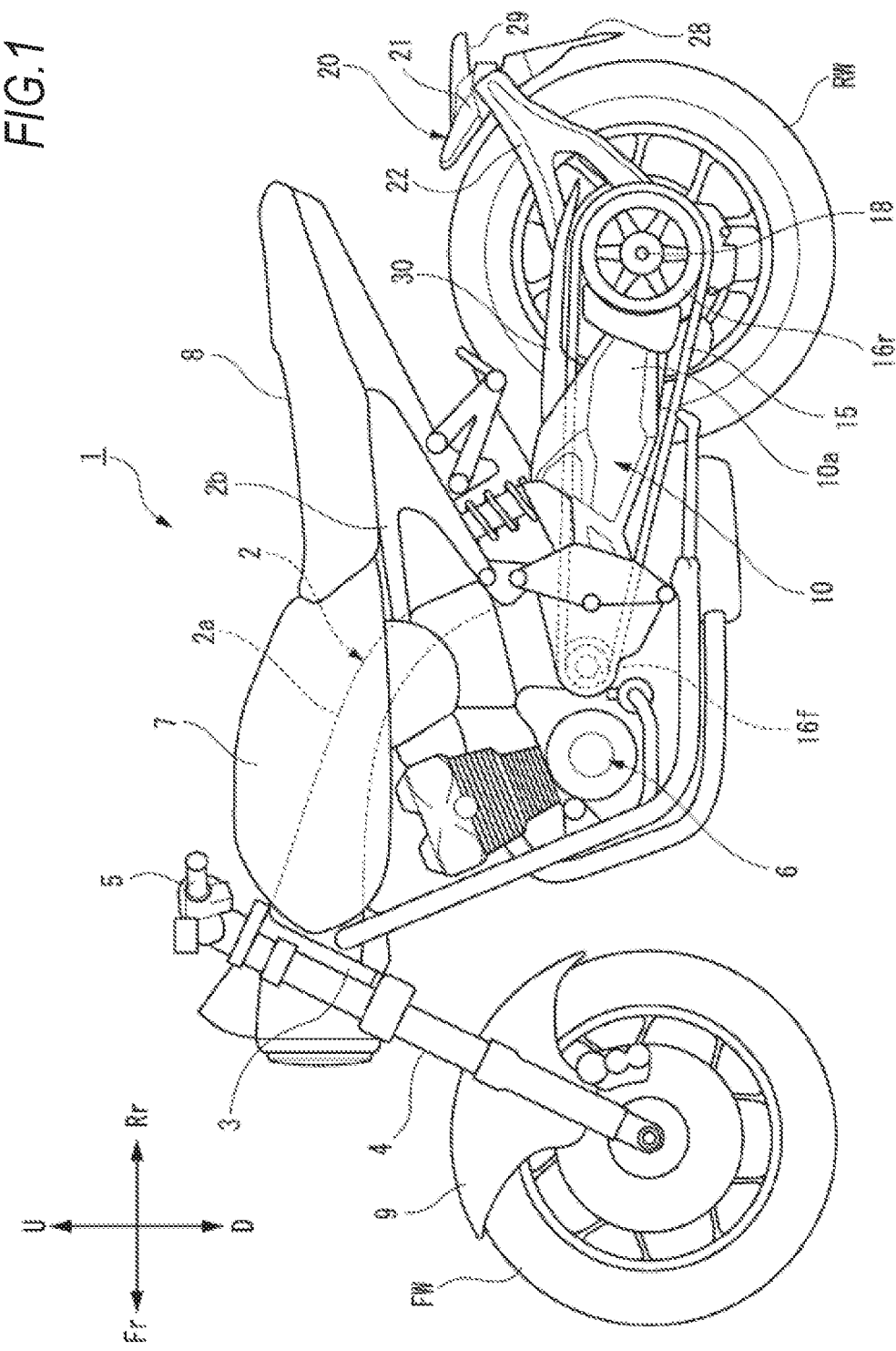
FIG. 1 is a left-side view illustrating a saddle-type vehicle of an embodiment according to the invention.

Hereinafter, a motorcycle which is a saddle-type vehicle according to an embodiment of the invention will be described with reference to FIGS. 1 to 8. The drawings should be seen based on a direction of reference numerals. In the drawings, front-rear, left-right and upper-lower directions are based on directions viewed by a driver, and front, rear, left, right, upper and lower sides are respectively denoted as reference characters Fr, Rr, L, R, U and D.

As illustrated in FIG. 1, a motorcycle 1 is configured such that a head pipe 3 is provided at a front portion of a body frame 2 which is a skeleton portion, and a front wheel FW is supported by a front fork 4 extending forward and downward from the head pipe 3. A handle 5 is connected to an upper part of the front fork 4. A fuel tank 7 is disposed on a main frame 2a of the body frame 2, a riding seat 8 is supported on a seat rail 2b, and an engine 6 is disposed below the fuel tank 7.

A rear wheel RW is supported swingably in an upper-lower direction via a swing arm 10 (also refer to FIG. 3) extending rearward of the body frame 2. The driving force of the engine 6 is transmitted by a chain 15, which is a power transmission member wound over a drive sprocket 16f on the engine side and a driven sprocket 16r on the rear wheel side.

An example of a cover member for covering the vehicle body may include not only a cover which covers a periphery of the engine but also a front fender 9 which covers an upper part of the front wheel FW or a rear fender 20 which covers a rear upper part of the rear wheel RW.

The front fender 9 is appropriately supported on left and right sides of the vehicle at left and right fork portions of the front fork 4. The rear fender 20 (described later) is supported by the swing arm 10 on either left or right side (left side in the embodiment) of the vehicle at the rear wheel RW. The rear fender 20 does not cover the entire area of the upper part of the rear wheel RW but has a compact structure of covering only the rear upper part of the rear wheel RW.

Figure 2:
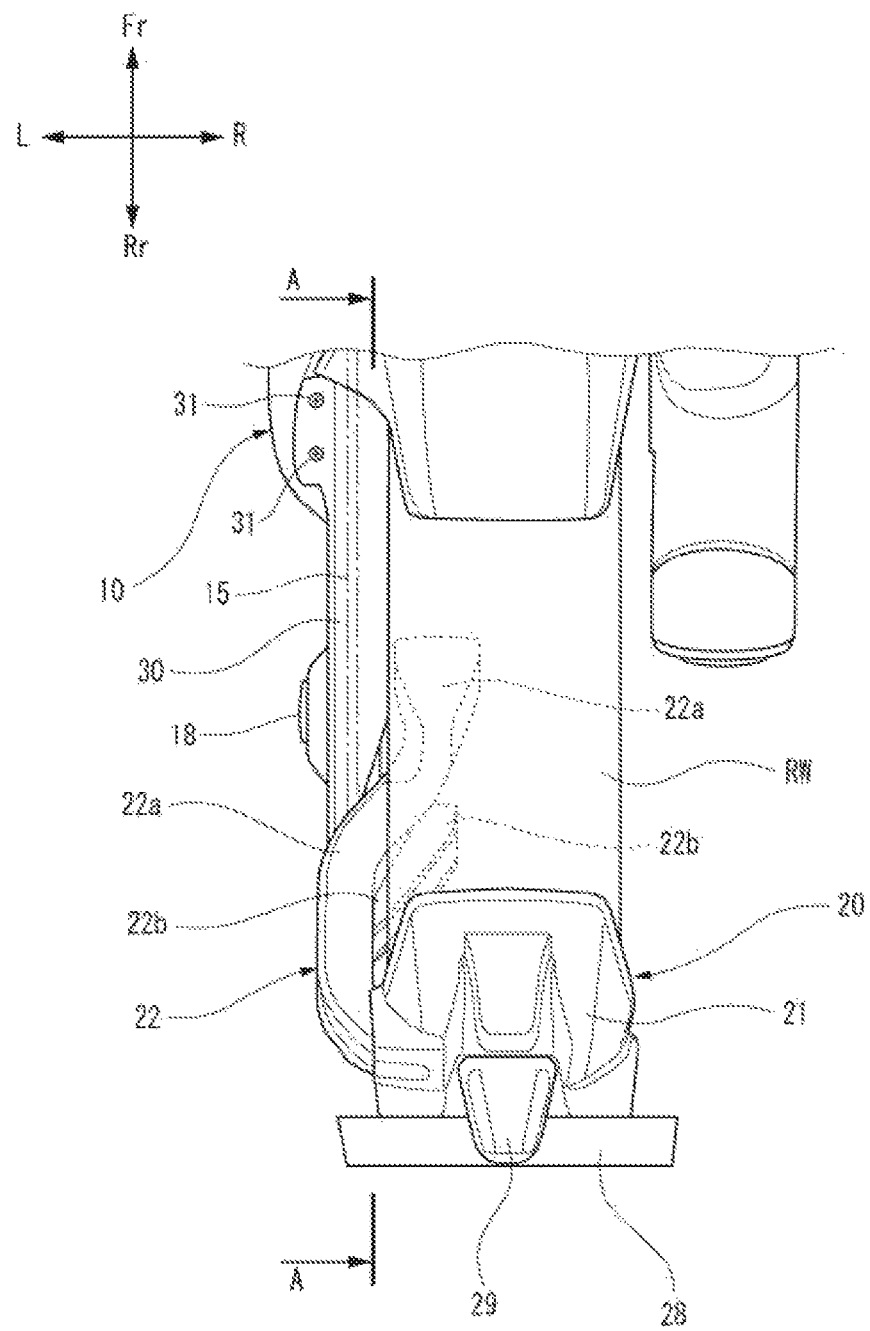
FIG. 2 is a plan view illustrating a rear part of the saddle-type vehicle in FIG. 1.
Figure 3:
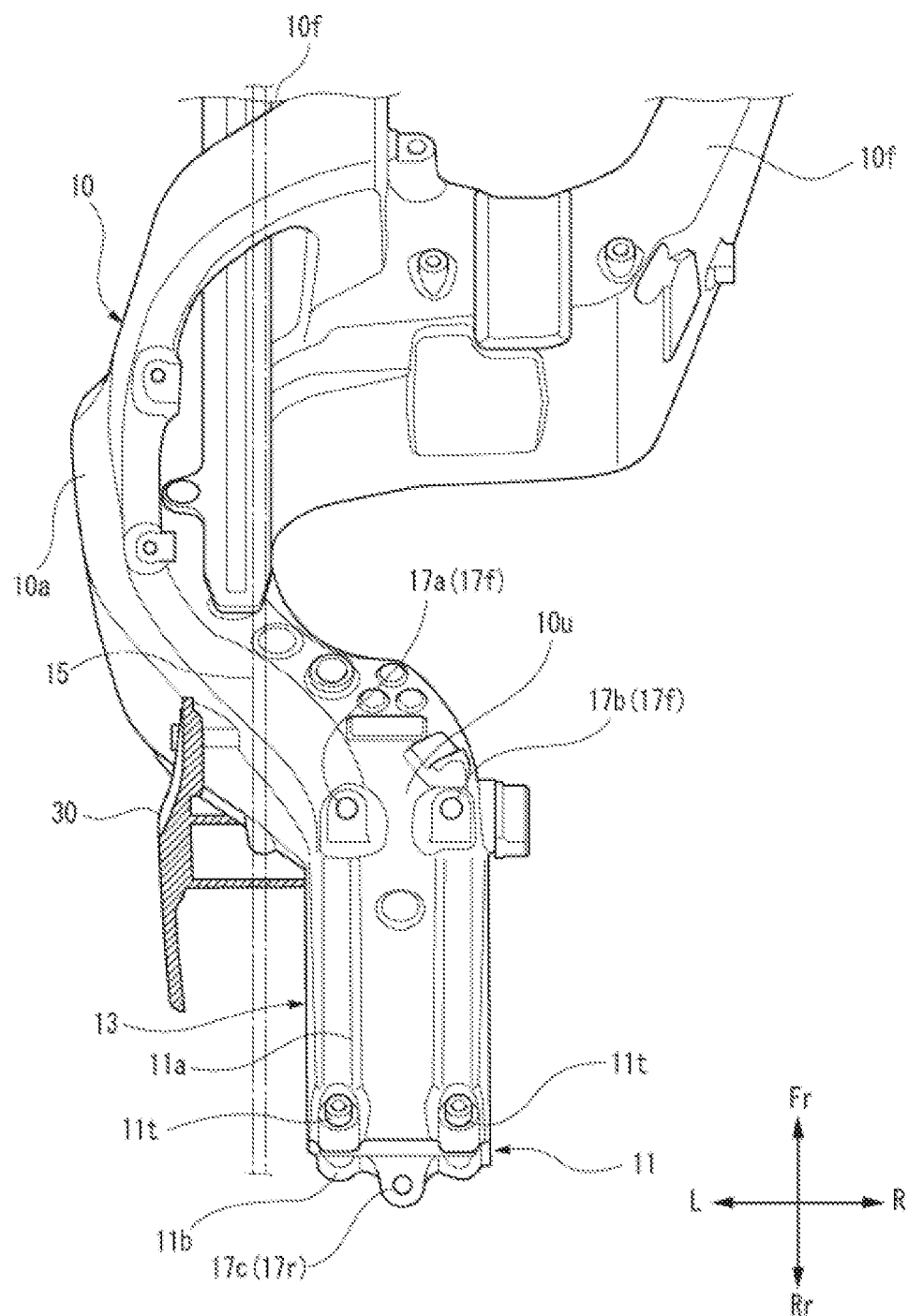
FIG. 3 is a rear upper perspective view illustrating a swing arm in FIG. 1.

As illustrated in FIGS. 2 and 3, the swing arm 10 of the embodiment has a cantilever structure in which only a side having the chain 15 in the left-right direction of the vehicle extends to the rear of the vehicle. Specifically, the swing arm 10 includes a front portion 10f rotatably supported to the body frame 2. The swing arm 10 includes an arm portion 10a which is curved so as to protrude to an outer side (a left side in FIG. 3) along a left side of the rear wheel RW from the left side of the front portion 10f and extends rearward. Further, a through hole 13 supporting an axle 18 (refer to FIG. 4) is provided on a rear end of the arm portion 10a.

A chain cover 30 is mounted to the swing arm 10 to cover the upper part of the chain 15 with a screw member 31 or the like.

Figure 4:
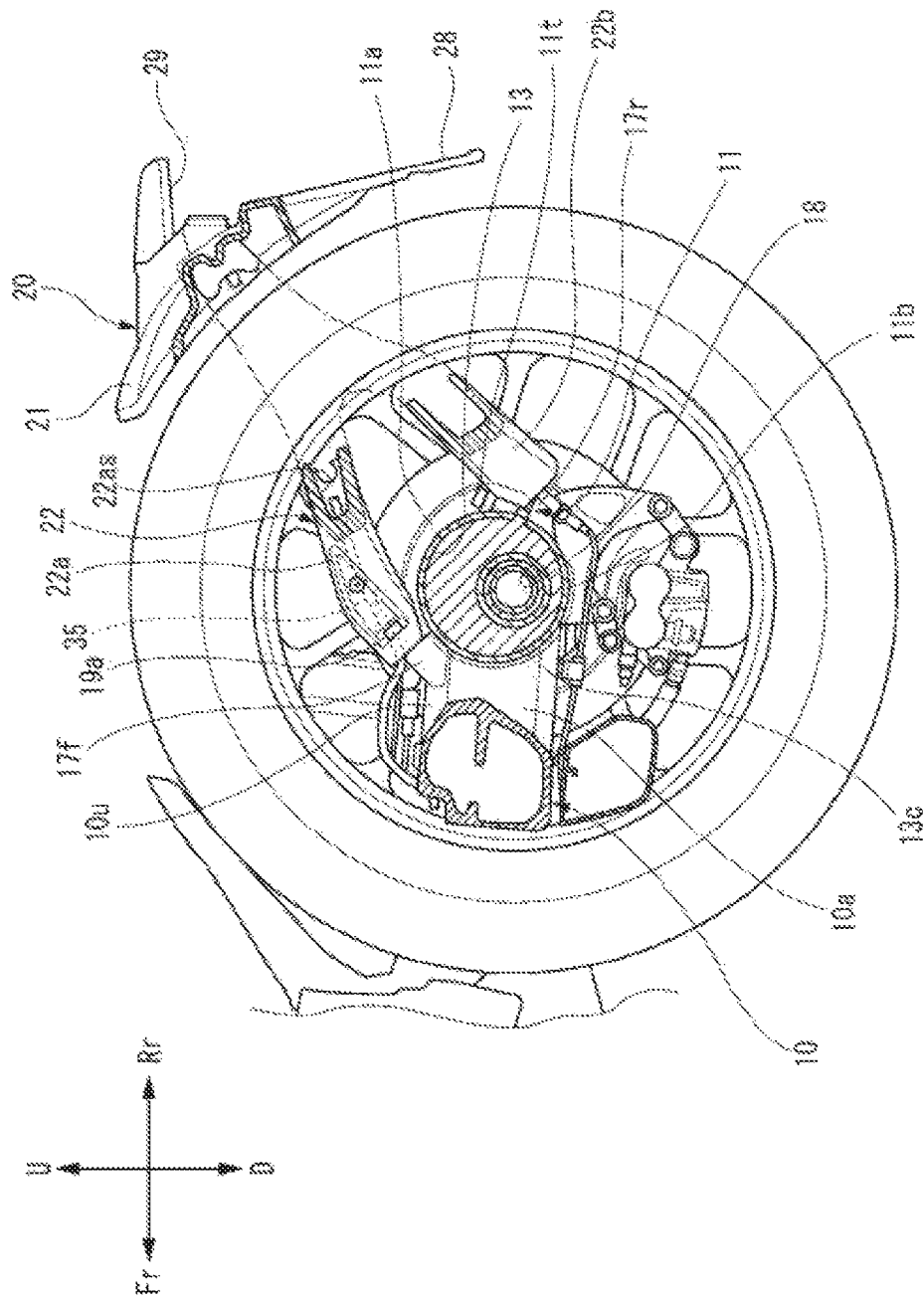
FIG. 4 is a cross-sectional view illustrating the rear part of the saddle-type vehicle taken along line A-A in FIG. 2.

As illustrated in FIG. 4, the through hole 13 of the arm portion 10a is a portion for holding a circular cam member 13c supporting the axle 18, and the swing arm 10 includes a split-clamp portion 11 which fastens the outer circumference of the circular cam member 13c. The split-clamp portion 11 includes vertically-divided upper and lower circular-arcs 11a, 11b so as to fasten the outer circumference of the circular cam member 13c, and a pair of fastening bolts 11t (refer to FIG. 3) are provided in the boundary portion of the upper circular-arc 11a and the lower circular-arc 11b.

The circular cam member 13c supports the axle 18 at an offset position from the center of the outer circumference of the circular cam member 13c. Therefore, the circular cam member 13c is rotated in the through hole 13, and the upper circular-arc 11a and the lower circular-arc 11b are fastened from the outer circumferences thereof by the pair of fastening bolts 11t, thereby adjusting the position of the axle 18 in the front-rear direction.

Here, the rear fender 20 is mounted on the swing arm 10. As illustrated in FIGS. 3 and 4, the rear fender 20 is mounted on the swing arm at two positions when viewed from the side. That is, the two positions are a front-side fixing portion 17f serving as a first mounting position which is positioned on the front side of the upper circular-arc 11a of the split-clamp portion 11 on the rear part of the swing arm 10 and is on an upper surface 10u of the arm portion 10a, and a rear-side fixing portion 17r serving as a second mounting position which is positioned on the rear side of the lower circular-arc 11b of the split-clamp portion 11.

The front-side fixing portion 17f and the rear-side fixing portion 17r are disposed substantially on a diagonal line with the circular cam member 13c interposed therebetween.

Figure 5:
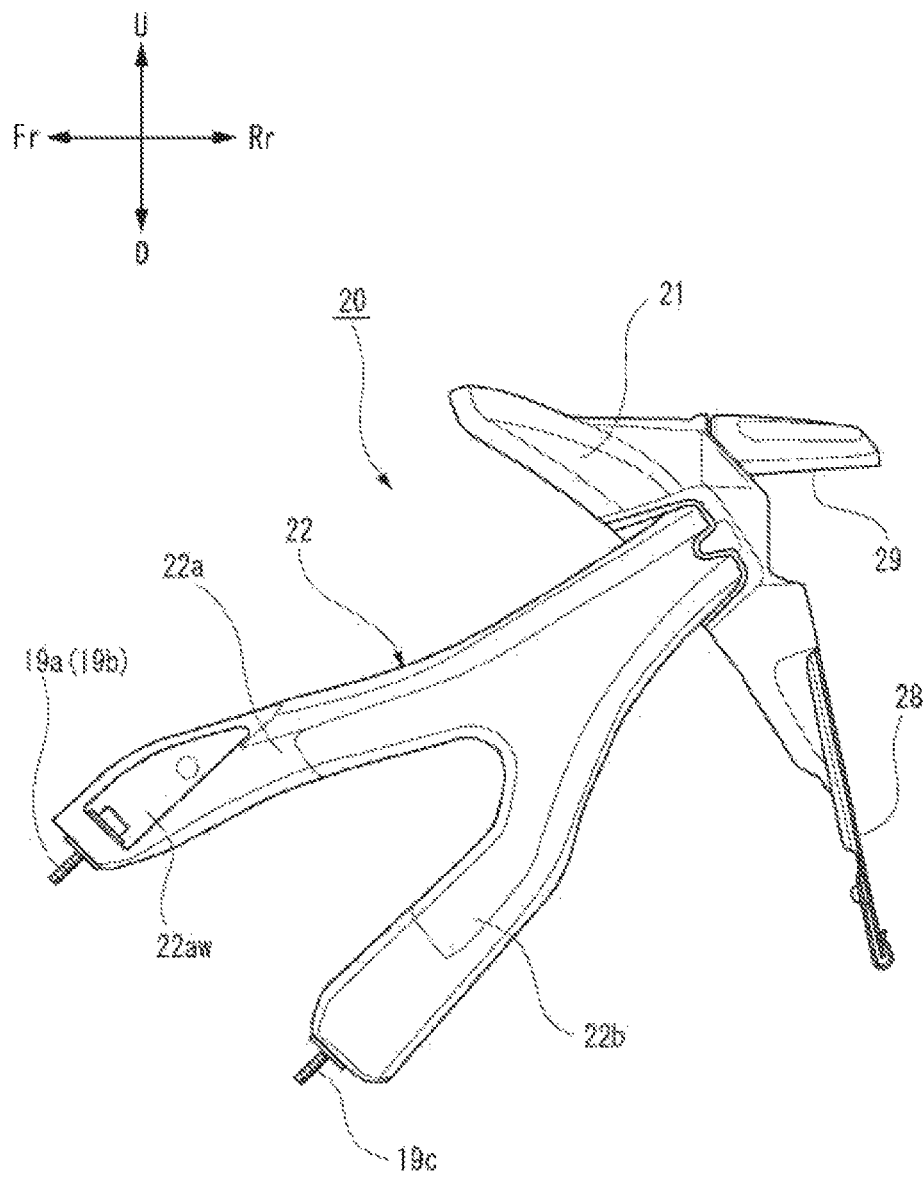
FIG. 5 is a left-side view illustrating a rear fender and a Y-shaped arm portion in FIG. 1.
Figure 6:
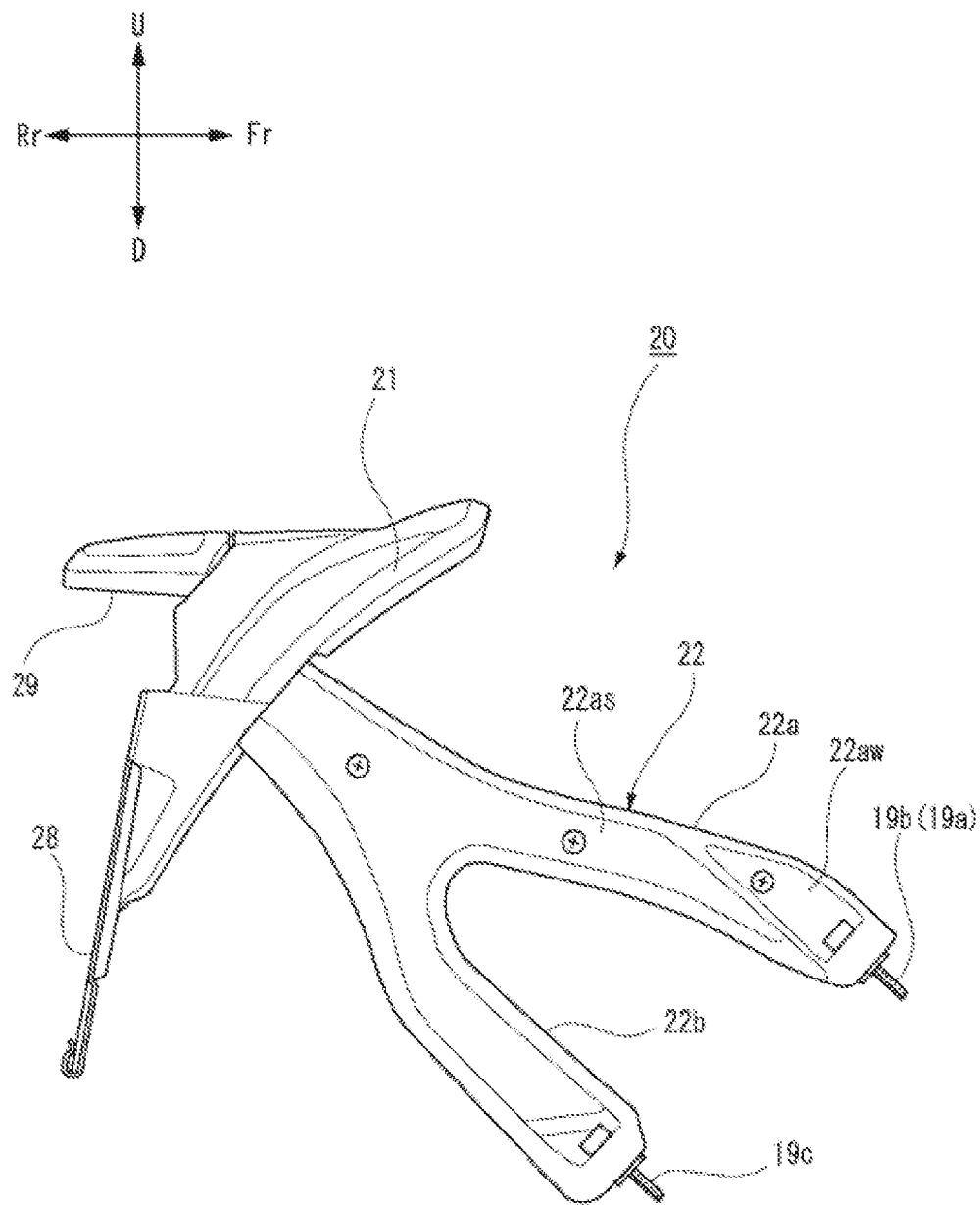
FIG. 6 is a right-side view illustrating the rear fender and the Y-shaped arm portion in FIG. 1.

As illustrated in FIGS. 5 and 6, the rear fender 20 includes a Y-shaped arm portion 22 in which a first mounting portion 22a fixed to the front-side fixing portion 17f (refer to FIGS.

3 and 4) and a second mounting portion 22b fixed to the rear-side fixing portion 17r (refer to FIGS. 3 and 4) extend to gradually come close to each other toward a fender body 21 when viewed from the side. That is, the Y-shaped arm portion 22 supports the fender body 21 which covers the upper side of the rear wheel RW.

The Y-shaped arm portion 22 is curved to one side in the left-right direction of the vehicle. That is, when viewed from above the vehicle (refer to FIG. 2), the Y-shaped arm portion 22 has a curved shape from the first mounting portion 22a and the second mounting portion 22b positioned inside the rear wheel RW (tire portion), to avoid the rear wheel RW.

The fender body 21 is a circular-arc shaped member when viewed from the side, which is formed to be smaller than the front fender 9 (refer to FIG. 1) on the front wheel FW side. The lower end of the rear part of the fender body 21 is configured to be attached with a number plate 28, and the upper part of the fender body 21 is provided with a backlight 29 for illuminating the number plate 28.

Further, the Y-shaped arm portion 22 has a substantially U-shaped cross-section (refer to FIG. 4). Accordingly, for example, an inner space 22as of the first mounting portion 22a can be used as a space through which a wire harness 35 for the backlight 29 passes.

Figure 7:
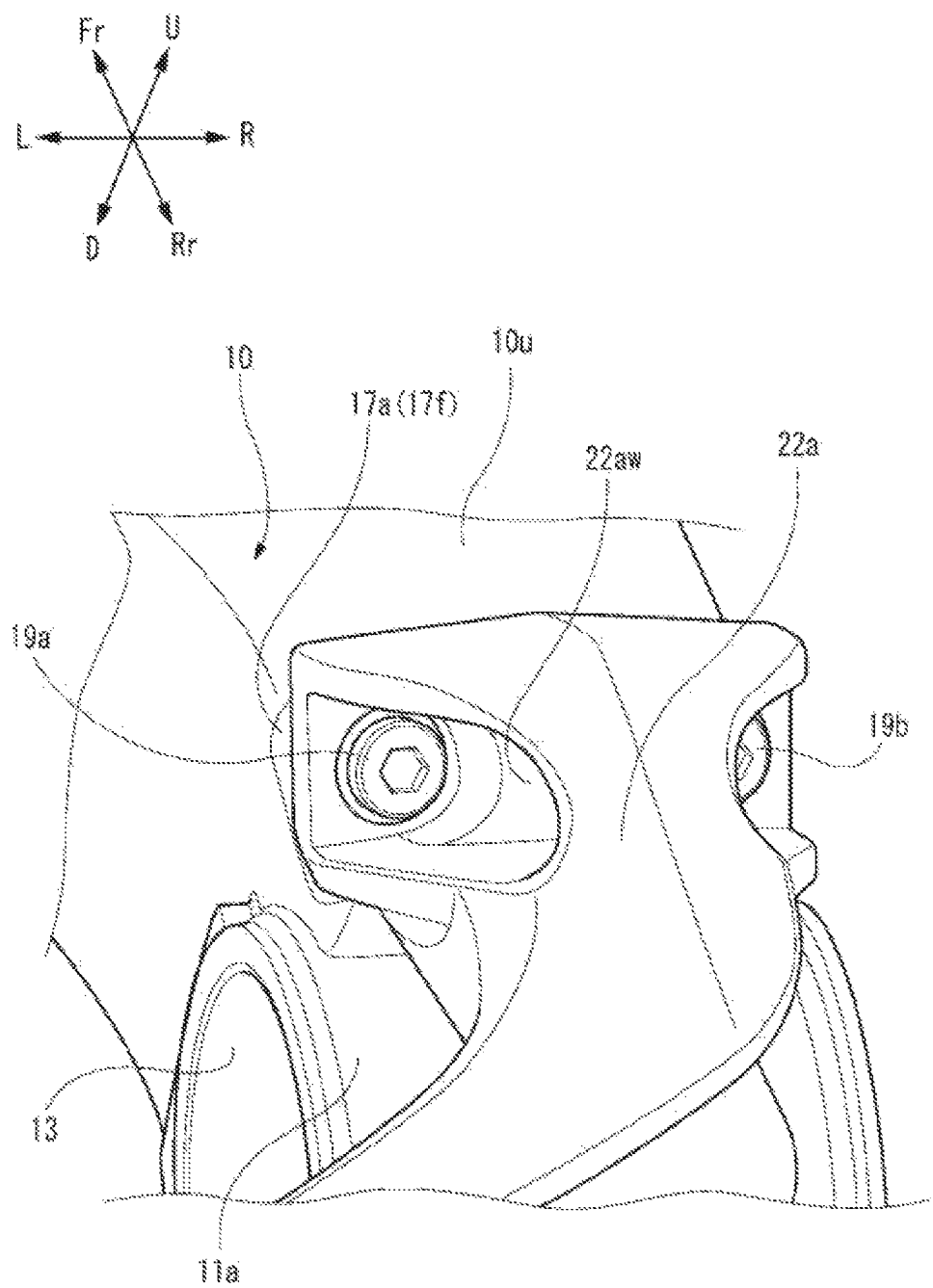
FIG. 7 is a perspective view illustrating a front-side fixing portion in FIG. 1.

As illustrated in FIGS. 3 and 7, the first mounting portion 22a of the Y-shaped arm portion 22 is mounted to the front-side fixing portion 17f (refer to FIG. 4) of the arm portion 10a located on the front side of the through hole 13. The front-side fixing portion 17f includes two boss portions 17a, 17b (refer to FIG. 3) provided side by side in the left-right direction of the vehicle. The first mounting portion 22a is mounted to the two boss portions 17a, 17b with fastening members 19a, 19b, respectively. The first mounting portion 22a is disposed such that the fastening members 19a, 19b are respectively disposed in the left and right sides with a wall surface 22aw provided at the tip end portion of the first mounting portion interposed therebetween.

Figure 8:
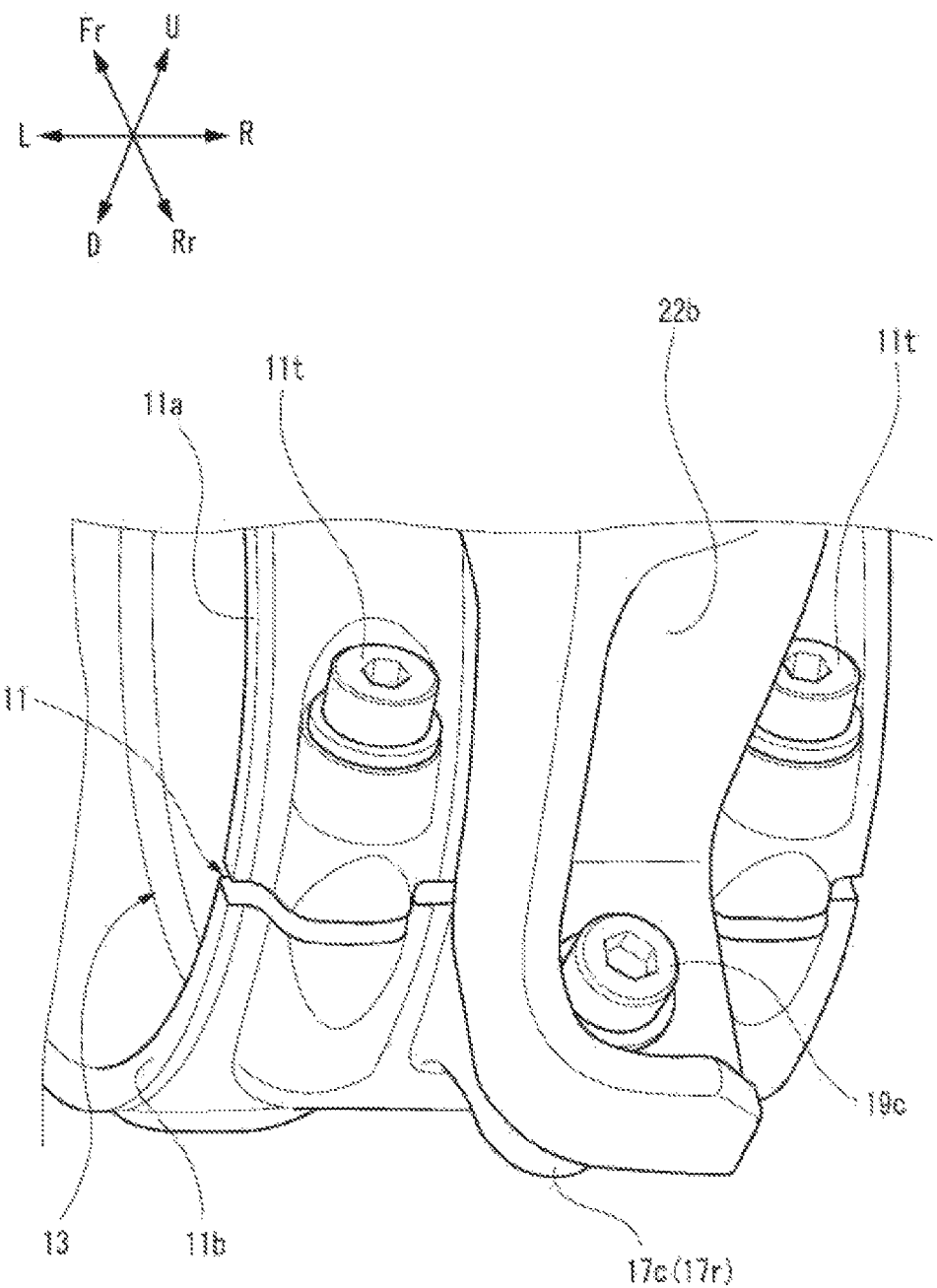
FIG. 8 is a perspective view illustrating a rear-side fixing portion in FIG. 1.

As illustrated in FIG. 8, the second mounting portion 22b is mounted to a boss portion 17c (refer to FIG. 3) of the rear-side fixing portion 17r positioned on the rear side of the through hole 13 with one fastening member 19c.

The fastening members 19a, 19b for mounting the first mounting portion 22a and the fastening member 19c for mounting the second mounting portion 22b are arranged substantially parallel to a direction orthogonal to the axle 18 when viewed from the axial direction of the axle 18 (refer to FIGS. 5 and 6).

As described above, in the embodiment, the rear fender 20 is supported at the rear part of the swing arm 10 such that the rear fender is mounted on the front-side fixing portion 17f which is positioned on the front side of the upper circular-arc 11a of the split-clamp portion 11 and is on the upper surface 10u of the arm portion 10a, and the rear-side fixing portion 17r which is positioned on the rear side of the lower circular-arc 11b of the split-clamp portion 11. Therefore, an increase in size of the supporting structure of the rear fender 20 is prevented and excellent appearance design properties can be achieved. Further, since the rear fender 20 is mounted at a position in the front-rear direction avoiding the split-clamp portion 11, it is possible to mount the rear fender 20 at a position where the influence on the fastening force of the split-clamp portion 11 is hardly exerted.

In the embodiment, the rear fender 20 includes the Y-shaped arm portion 22 in which the first mounting portion 22a fixed to the front-side fixing portion 17f and the second mounting portion 22b fixed to the rear-side fixing portion 17r extend to come gradually close to each other toward the fender body 21 when viewed from the side, the fender body 21 covering the upper side of the rear wheel RW. Therefore, the supporting structure can be made compact and reduced in weight, and it is possible to improve appearance design properties. In addition, since either the first mounting portion 22a or the second mounting portion 22b of the Y-shaped arm portion 22 is fastened by the two fastening members 19a, 19b, the rear fender 20 is fixed in the swing arm 10 at total three positions, and thereby improving the support rigidity.

In the embodiment, since the fastening members 19a, 19b for mounting the first mounting portion 22a and the fastening member 19c for mounting the second mounting portion 22b are arranged substantially parallel to the direction orthogonal to the axle 18 when viewed from the axial direction of the axle 18, it is possible to reduce the influence of the fastening forces of the fastening members 19a, 19b, and 19c on the split-clamping force of the upper circular-arc 11a and the lower circular-arc 11b of the split-clamp portion 11. As a result, the fastening force of the fastening bolt 11t of the split-clamp portion 11 is hardly affected, and thereby easily maintaining the fastening force of the fastening bolt 11t.

In the embodiment, since the Y-shaped arm portion 22 is curved to one side in the left-right direction of the vehicle, it is possible to lengthen the Y-shaped arm portion 22 to moderately reduce the rigidity. As a result, even when the Y-shaped arm portion 22 is fixed in a structure to straddle the split-clamp portion 11, it is possible to reduce the influence on the fastening force of the split-clamp portion 11.

In the embodiment, since the front-side fixing portion 17f and the rear-side fixing portion 17r are disposed substantially on a diagonal line with the circular cam member 13c interposed therebetween. Therefore, the gap between the front-side fixing portion 17f and the rear-side fixing portion 17r can be increased. In addition, the support rigidity of the Y-shaped arm portion 22 can be improved by increasing the width of the tip end portion of the first mounting portion 22a and the second mounting portion 22b of the Y-shaped arm portion 22.

In the above, the embodiment according to the present invention has been described. However, the invention is not limited to the embodiment but can be appropriately changed. For example, the first mounting portion 22a of the rear fender 20 is fastened by the two fastening members 19a, 19b in the above-described embodiment. However, two fastening members may be provided in the second mounting portion 22b.

Further, although a motorcycle is exemplified in the above-described embodiment, the invention may be applied to another saddle-type vehicle such as a buggy.

The invention claimed is:

1. A rear fender supporting structure of a saddle-type vehicle comprising:
   a rear wheel which is supported through a swing arm to a body frame swingably in an upper-lower direction; and
   a rear fender which covers a rear upper part of the rear wheel,
   wherein the rear fender is supported to the swing arm on one side in a left-right direction of the saddle-type vehicle,
   wherein the swing arm includes:
      an arm portion which extends in a front-rear direction of the saddle-type vehicle;
      a through hole which is provided at a rear end of the arm portion to support an axle; and a split-clamp portion which supports the axle by fastening an upper circular-arc and a lower circular-arc surrounding the through hole with a fastening member, wherein the rear fender is mounted on a front-side fixing portion which is positioned on a front side of the upper circular-arc and is on an upper surface of the arm portion, and on a rear-side fixing portion which is positioned on a rear side of the lower circular-arc, wherein the swing arm has a cantilever structure configured only by a side on which a power transmission member for the rear wheel is provided in the left-right direction of the saddle-type vehicle, and wherein the front-side fixing portion and the rear-side fixing portion are disposed substantially on a diagonal line with the through hole interposed therebetween.

2. The rear fender supporting structure according to claim 1, wherein the rear fender includes a Y-shaped arm portion in which a first mounting portion fixed to the front-side fixing portion and a second mounting portion fixed to the rear-side fixing portion extend to come close to each other toward a fender body when viewed from a side, the fender body covering the rear upper part of the rear wheel, and wherein either the first mounting portion or the second mounting portion is fastened with two fastening members.

3. The rear fender supporting structure according to claim 2, wherein a fastening member for mounting the first mounting portion and a fastening member for mounting the second mounting portion are disposed substantially parallel to a direction orthogonal to the axle when viewed from an axial direction of the axle.

4. The rear fender supporting structure according to claim 2, wherein the Y-shaped arm portion is curved to one side in the left-right direction of the saddle-type vehicle.

5. The rear fender supporting structure according to claim 1, wherein the split-clamp portion has a structure in which the upper circular-arc and the lower circular-arc fasten an outer circumference of a circular cam member capable of adjusting a position of the axle with respect to the swing arm, and wherein the front-side fixing portion and the rear-side fixing portion are disposed substantially on a diagonal line with the circular cam member interposed therebetween.

6. The rear fender supporting structure according to claim 2, wherein a backlight for illuminating a number plate is provided on an upper part of the fender body, and wherein the Y-shaped arm portion has a substantially U-shaped cross-section, and an inner space of the first mounting portion is used as a spaced through which a wire harness for the backlight passes.

* * * * *